US008654489B2

(12) United States Patent
Farbarik et al.

(10) Patent No.: US 8,654,489 B2
(45) Date of Patent: Feb. 18, 2014

(54) METHOD AND APPARATUS FOR SWITCHED ELECTROSTATIC DISCHARGE PROTECTION

(75) Inventors: Raymond J. Farbarik, Seattle, WA (US); Jeremy Stephens, Seattle, WA (US); Gerald J. Twomey, San Diego, CA (US)

(73) Assignee: Cray Inc., Seattle, WA (US)

( * ) Notice: Subject to any disclaimer, the term of this patent is extended or adjusted under 35 U.S.C. 154(b) by 167 days.

(21) Appl. No.: 13/175,387

(22) Filed: Jul. 1, 2011

(65) Prior Publication Data

US 2012/0176711 A1    Jul. 12, 2012

Related U.S. Application Data

(63) Continuation of application No. 12/109,679, filed on Apr. 25, 2008, now Pat. No. 7,974,052.

(51) Int. Cl.
*H02H 3/20* (2006.01)
*H02H 9/04* (2006.01)

(52) U.S. Cl.
USPC ............ 361/56; 361/111; 361/91.1; 361/91.5

(58) Field of Classification Search
USPC .................................. 361/56, 111, 91.1, 91.5
See application file for complete search history.

(56) References Cited

U.S. PATENT DOCUMENTS

| | | | |
|---|---|---|---|
| 5,241,450 A * | 8/1993 | Bernhardt et al. | ............ 361/689 |
| 5,440,162 A | 8/1995 | Worley et al. | |
| 5,946,176 A | 8/1999 | Ghoshal | |
| 6,052,269 A | 4/2000 | Tang et al. | |
| 6,418,006 B1 | 7/2002 | Liu et al. | |
| 6,489,662 B1 | 12/2002 | Takasu | |
| 6,489,857 B2 | 12/2002 | Petrarca et al. | |
| 6,501,282 B1 | 12/2002 | Dummermuth et al. | |
| 6,556,409 B1 * | 4/2003 | Chittipeddi et al. | .......... 361/111 |
| 6,570,750 B1 * | 5/2003 | Calcatera et al. | ............. 361/115 |
| 6,574,078 B1 | 6/2003 | Voldman | |
| 6,578,436 B1 | 6/2003 | Ganapathi et al. | |
| 6,624,998 B2 | 9/2003 | May et al. | |
| 6,704,180 B2 | 3/2004 | Tyler et al. | |
| 6,813,122 B1 | 11/2004 | Granstrom | |

(Continued)

OTHER PUBLICATIONS

U.S. Appl. No. 12/109,679 Non-Final Office Action mailed Jul. 23, 2010, 30 pgs.

(Continued)

*Primary Examiner* — Rexford Barnie
*Assistant Examiner* — Zeev V Kitov
(74) *Attorney, Agent, or Firm* — Craig J. Lervick; Larkin Hoffman Daly & Lindgren Ltd.

(57) ABSTRACT

One embodiment includes an integrated circuit including an input circuit, a first diode including a first anode and a first cathode, with the first cathode coupled to a first voltage, the first anode coupled to the input circuit at a node via a first mechanical switch, a second diode including a second anode and a second cathode, with the second cathode coupled to the node via a second mechanical switch, the second anode coupled to a ground and a resistor coupled to the input circuit between the integrated circuit and the node, wherein in a first mode of operating, the first mechanical switch and the second mechanical switch are conducting, and in a second mode of operating, the first and second mechanical switches are non-conducting.

7 Claims, 5 Drawing Sheets

(56) References Cited

U.S. PATENT DOCUMENTS

| | | | |
|---|---|---|---|
| 6,847,266 B2 | 1/2005 | Laney et al. | |
| 6,888,748 B2 | 5/2005 | Blodgett | |
| 6,889,565 B2 | 5/2005 | DeConde et al. | |
| 6,898,062 B2 | 5/2005 | Russ et al. | |
| 7,046,488 B1 * | 5/2006 | Hogg | 360/323 |
| 7,372,349 B2 | 5/2008 | Wheeler et al. | |
| 7,436,718 B2 | 10/2008 | Tanaka et al. | |
| 7,464,459 B1 | 12/2008 | Niblock et al. | |
| 7,505,238 B2 * | 3/2009 | Woo et al. | 361/56 |
| 7,511,931 B2 | 3/2009 | Fairgrieve | |
| 7,612,971 B2 | 11/2009 | Premerlani et al. | |
| 7,974,052 B2 | 7/2011 | Farbarik et al. | |
| 2001/0017755 A1 | 8/2001 | Toyoshima | |
| 2009/0046401 A1 | 2/2009 | Dunnihoo et al. | |
| 2009/0268358 A1 | 10/2009 | Farbarik et al. | |

OTHER PUBLICATIONS

U.S. Appl. No. 12/109,679, Final Office Action mailed Dec. 7, 2010, 20 pgs.

U.S. Appl. No. 12/109,679, Notice of Allowance mailed Feb. 28, 2011, 11 pgs.

U.S. Appl. No. 12/109,679, Response filed Feb. 7, 2011 to Final Office Action mailed Dec. 7, 2010, 12 pgs.

U.S. Appl. No. 12/109,679, Response filed Oct. 25, 2010 to Non Final Office Action mailed Jul. 23, 2010, 18 pgs.

* cited by examiner

METHOD AND APPARATUS FOR SWITCHED ELECTROSTATIC DISCHARGE PROTECTION

CLAIM OF PRIORITY

This application is a continuation of and claims the benefit of priority under 35 U.S.C. §120 to Farbarik et al., U.S. patent application Ser. No. 12/109,679, entitled "METHOD AND APPARATUS FOR SWITCHED ELECTROSTATIC DISCHARGE PROTECTION," filed on Apr. 25, 2008, which is hereby incorporated by reference herein in its entirety.

GOVERNMENT FUNDING

The U.S. Government has a paid-up license in this invention and the right in limited circumstances to require the patent owner to license others on reasonable terms as provided for by the terms of Contract No. NBCH3039003 awarded by the Defense Advanced Research Projects Agency (DARPA).

TECHNICAL FIELD

The present subject matter generally relates to electrical circuits, and more particularly, to a method and apparatus for switched electrostatic discharge protection.

BACKGROUND

Electrical circuits can be damaged by electrostatic electricity. Protection is needed to ensure that computer and other circuits can be constructed and used without suffering from decreases in performance caused by electrostatic discharge.

SUMMARY

One embodiment includes an integrated circuit that includes an input circuit. The embodiment includes, not by way of limitation, a first diode including a first anode and a first cathode, with the first anode coupled to the input circuit at a node via a first mechanical switch, the first cathode coupled to a first voltage, a second diode including a second anode and a second cathode, with the second cathode coupled to the node via a second mechanical switch, the second anode coupled to a ground. The embodiment includes a resistor coupled to an input circuit between the integrated circuit and the node, wherein in a first mode of operating, the first mechanical switch and the second mechanical switch are conducting, and in a second mode of operating, the first and second mechanical switches are nonconducting.

Various options are contemplated. In some embodiments, the first and second mechanical switch to nonconducting only once. In additional embodiments, the first and second mechanical switches are biased to conducting. In some embodiments, the first and second mechanical switches include electromagnets adapted to allow the mechanical switch to conducting or to nonconducting. In some embodiments, the integrated circuit is part of a first integrated circuit, and the first and second diodes and first and second switches are part of a second integrated circuit. Additional embodiments include a hardware supervising system to control the first and second mechanical switches. Some embodiments include a second integrated circuit to control the first and second mechanical switches.

Another embodiment includes a method of signaling in a computer. This method includes, not by way of limitation, coupling an integrated circuit to an input circuit, coupling a first cathode of a first diode to a first voltage, and coupling a first anode of the first diode to the input circuit at a node, the first diode coupled to the input circuit with a first mechanical switch. The embodiment also includes coupling a second cathode of a second diode to the node with a second mechanical switch and coupling a second anode of the second diode to a ground. The embodiment further includes coupling a resistor to the input circuit between the node and the integrated circuit and switching the first and second mechanical switches between a conducting state and a nonconducting state.

Yet another embodiment includes, not by way of limitation, controlling a first and second switch to switch the first and second switches to a conductive state such that a signal circuit is conductive with a first voltage via a first diode, and with a ground via a second diode. The embodiment includes assembling at least one computer component to the signal circuit while the first and second mechanical switches are switched to a conductive state. After assembly, the embodiment includes controlling the first and second switches to switch to a nonconductive state such that the signal circuit is nonconductive with the first voltage via the first diode, and is nonconductive with the ground via the second diode. The embodiment includes electrically signaling via the signal circuit after assembly.

Various options are contemplated. In one optional embodiment, the method includes switching the first and second mechanical switches to conducting during the coupling of the node to an additional circuit, and switching the first and second switches to nonconducting after coupling of the node to the additional circuit. In another optional embodiment, the additional circuit is part of a circuit board assembly. In an optional embodiment, the method includes switching the first and second mechanical switches to a nonconducting state after a power-on reset.

In additional optional embodiments of one or more methods disclosed herein, the integrated circuit is part of a system including a subsystem, and the one or more embodiments further include verifying the subsystem before switching the first and second mechanical switches to the nonconducting state. Some of these embodiments include switching the first and second mechanical switches to a conducting state during shipment, assembly, and installation of the subsystem to the system. In various embodiments, the mechanical switches are biased. Some embodiments include coupling an electromagnet to the mechanical switches and switching the mechanical switches between the conducting state and the nonconducting state by controlling power to the electromagnet. In some embodiments, the mechanical switches are biased to the conducting state. Some embodiments include coupling a fuse to the electromagnet and controlling the fuse to blow such that the mechanical switches become nonconducting.

Yet another embodiment includes, not by way of limitation, an integrated circuit, comprising an input circuit, a first diode including a first anode and a first cathode, with the first anode coupled to the input circuit at a node with a first switch, the first cathode coupled to a first voltage. The embodiment includes a second diode including a second anode and a second cathode, with the second cathode coupled to the node with a second switch, the second anode coupled to a ground. The embodiment includes a resistor coupled to the input circuit between the integrated circuit and the node and a third mechanical switch coupling the resistor and the integrated circuit and the node.

Various optional embodiments are included. In some embodiments, in a first mode of operating, the first switch and the second switch are held in conducting positions while the third switch is held in a nonconducting position, and in a second mode of operating, the first and second switches are held in nonconducting positions while the third switch is held in a conducting position. In some embodiments, the first, second and third switches are mechanical. In additional embodiments, the first, second and third switches are solid state. Additional embodiments include a hardware supervising system to control the first, second and third switches.

Yet another embodiment includes, not by way of limitation, an integrated circuit, including an input circuit, a resistor coupled to the input circuit between the integrated circuit and a node and a first mechanical switch coupled between the node and a ground.

Yet another embodiment includes, not by way of limitation, an integrated circuit, comprising an input circuit, a first mechanical switch coupled to the input circuit between the integrated circuit and a node and a resistor coupled between the node and a ground.

Yet another embodiment includes, not by way of limitation, an integrated circuit, comprising an input circuit, a first mechanical switch coupled to the input circuit between the integrated circuit and a node and a second mechanical switch coupled between the node and a ground.

This summary is intended to provide an overview of the subject matter of the present patent application. It is not intended to provide an exclusive or exhaustive explanation of the invention. The detailed description is included to provide further information about the subject matter of the present patent application.

DETAILED DESCRIPTION

Figure 1:
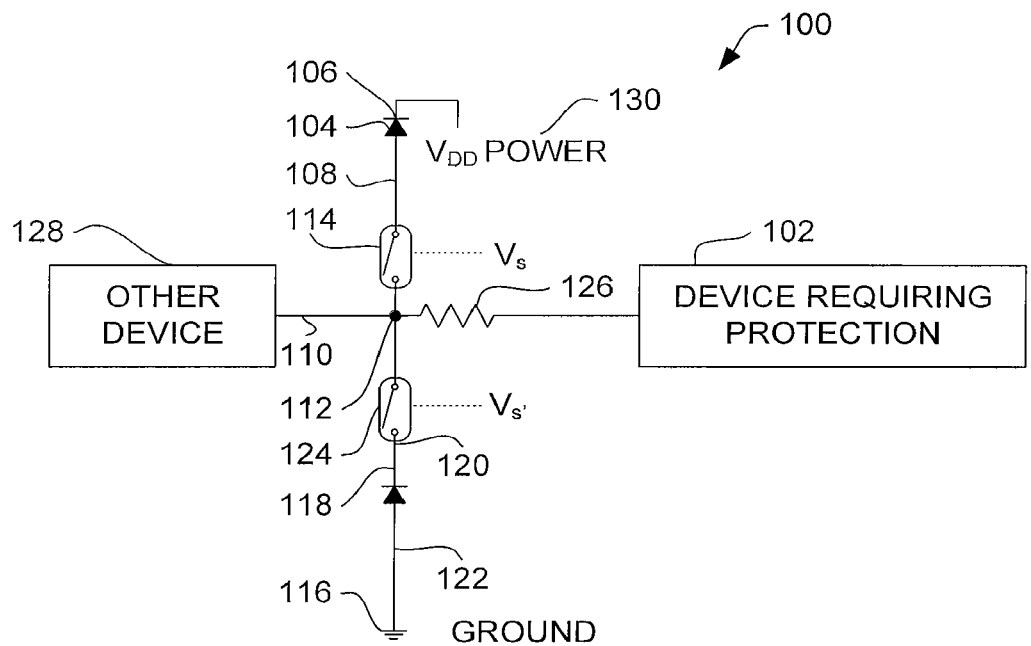
FIG. 1 is a diagram illustrating an electrostatic protection circuit including switched diodes, according to some embodiments.

In the following detailed description, reference is made to the accompanying drawings which form a part hereof, and specific embodiments in which the invention may be practiced are shown by way of illustration. It is to be understood that other embodiments may be used and structural or logical changes may be made without departing from the scope of the present invention.

Electrostatic discharge (or "ESD") can damage electronic circuitry. During the construction, assembly and use of electronics, electrostatic charge can build up on a first electronic device, a tool or even an assembly person. When the entity carrying the electrostatic charge is coupled to a second electronic device such as an integrated circuit, that second device can receive some or all of an electrostatic charge and can be damaged by that charge.

Electrostatic charge can accumulate in a variety of ways. "Antenna effect" is a common name for charge accumulated in isolated nodes of an integrated circuit during its processing. Damage from such charge is alternatively referred to as plasma induced damage or process induced damage. Such charge accumulation can result in failure of a device, or it can result in degraded performance of a device. Degraded performance includes, but is not limited to, degradation caused by an increase of gate oxide leakage current, an increase of the threshold voltage of the transistors, degradation of the gate oxide lifetime, degradation of the transconductance of transistors, increase of the noise generated by the devices or increase of hot-electron effects. In analog circuits, degradation includes, but is not limited to, mismatch between devices, increase of intrinsic noise, and lower amplification and bandwidth.

There are several process steps during which charge can accumulate. Various processes include flooding a surface of a wafer with ions. For example, etching of metal and polysilicon can cause charge to build. Charge can additionally accumulate during processes including, but not limited to, photoresist ashing by plasma after metal or polysilicon etch, during ion implantation while forming the metal oxide semiconductor ("MOS") devices, and during plasma-enhanced deposition of dielectric on top of the conductors. Such charge accumulation can occur without causing damage in downstream assembly processes if devices requiring protection from charge accumulation include protective elements, such as circuits designed to protect against harmful energy discharge.

The present subject matter, in various embodiments, provides protection from ESD and other charges. The present subject matter addresses electrostatic discharge by reducing the potential for such charge to damage circuits by providing several circuits adapted to diminish or eliminate unwanted charge. Disabling some or all diodes provides a benefit of reducing parasitic capacitance and allows circuitry to operate at higher signal rates. The deactivation or elimination of diodes provides low operating resistance of the device requiring protection. In some circuit embodiments discussed herein, including those that do not include diodes, one benefit is smaller integrated circuit size and thus reduced cost.

FIG. 1 is a diagram illustrating an electrostatic protection circuit including switched diodes, according to some embodiments. Various embodiments include an electrical device requiring protection 102. Devices requiring protection include, but are not limited to, circuits sized such that they can be damaged by electrostatic discharge (hereinafter "ESD"), such as an integrated circuit. The illustrated embodiment includes a first diode 104. First diode 104 includes a first cathode 106 and a first anode 108. In some embodiments, the first anode 108 is coupled to an input circuit 110 at a node 112. In some embodiments, this coupling is via a first switch 114. In various embodiments, the first switch 114 is mechanical. In various embodiments, the first cathode 106 is coupled to a first voltage 130. In some embodiments, the first voltage is $V_{DD}$ power, but the present subject matter is not so limited.

Switches described herein are additionally solid state in some examples. One or more of the switches disclosed herein include junctions comprising, but not limited to, silicon on insulator ("SOI"), complementary metal-oxide-semiconductor ("CMOS"), bulk CMOS, SOI-CMOS, bipolar nodes, bi-CMOS, silicon germanium ("SiGe") and indium phosphide ("InP") and combinations thereof.

Various embodiments include a second diode 118 including a second cathode 120 and a second anode 122. In some examples, the second cathode 120 is coupled to the node 112 via a second switch 124. In various embodiments, the second switch 124 is mechanical. In some examples, the second anode 122 is coupled to a ground 116. Various embodiments include a resistor 126 coupled to the input circuit 110 between the electrical device requiring protection 102 and the node 112. Although a ground is illustrated, the present subject matter is not so limited, and another reference circuit may be used, including a circuit having voltage.

Mechanical switches, in various embodiments, are part of a microelectromechanical system (MEMS). In additional embodiments, they are larger than MEMS switches. Various switches are contemplated, including, but not limited to, toggle switches and jumpers. Various mechanical contact designs are contemplated, including, but not limited to, see-saw switches, hobby horse switches, double pole switches, and switches including a disk with contacts that rotate to put the disk contacts into and out of electrical communication with housing contacts.

In some embodiments, in a first mode of operating, the first switch 114 and the second switches 124 are concurrently conducting. In some of these embodiments, in a second mode of operating, the first 114 and second 124 switches are concurrently nonconducting. Embodiments are contemplated wherein the first switch 114 is nonconducting and the second switch 124 is conducting, and vice versa.

In some examples, one or both of the first switch 114 and the second switch 124 includes an electromagnet adapted to open switch contacts. In some examples, power for the electromagnet is provided via toggle or jumper switch that controls voltage $V_s$ to the electromagnet. In some embodiments, the first switch 114 is configured to switch to nonconducting only once. In some of these examples, a fuse is coupled to voltage $V_s$. In some of these examples, the fuse is blown purposely. The fuse can optionally be removed. The second switch 124 can optionally be one-way as well, controlled by voltage $V_{s'}$. In some examples, a fuse is coupled to voltage $V_s$ and voltage $V_{s'}$, and that fuse is associated with a relay coil for the first switch 114 and a relay coil for the second switch 124. This single fuse can be blown or removed such that both switches are no longer operable. In some of these examples, one or both of the first switch 114 and the second switch 124 includes a bias such that when a coil is not powered to influence the switch, the switch is biased to nonconducting. Switches that are biased to conducting are additionally contemplated.

The electrostatic discharge protection system 100 protects against electrostatic discharge originating from another device 128. In some examples, the device requiring protection 102 is part of a first integrated circuit. In some of these examples, the other device 128 is part of the same integrated circuit. In some examples, the other device 128 is a pad. In some examples, this first integrated circuit is located on a first integrated circuit. In some examples, the other device 128 is a pad coupled to the first integrated circuit. In additional examples, the first diode 104 and second diode 118 and first switch 114 and second switch 124 are part of a second integrated circuit other than the first integrated circuit. In some instances, the second integrated circuit is part of a second integrated circuit other than the first integrated circuit.

In various embodiments, the device requiring protection 102 controls one or both of the first switch 114 and the second switch 124. In additional embodiments, a second integrated circuit other than the device requiring protection 102 controls the first switch 114 and the second switch 124. In various examples, a hardware supervising system controls the first switch 114 and second switch 124. The hardware supervising system, in various embodiments, switches a switch between conducting and nonconducting according to a predetermined program. A predetermined program can be hardware-based or stored as software in a memory. Such a memory can be part of the hardware supervising system, or can be part of another system. In various embodiments, the hardware supervising system can provide a voltage to blow a fuse coupled to one or both of the first switch 114 and the second switch 124. Switching one or both of the first switch 114 and the second switch 124 to a nonconducting state can increase the signal rate possible between the other device 128 and the device requiring protection 102. This is due in part to a reduction in capacitance of the associated signal circuit caused, in some examples, by one or more diodes used for ESD protection.

Figure 2:
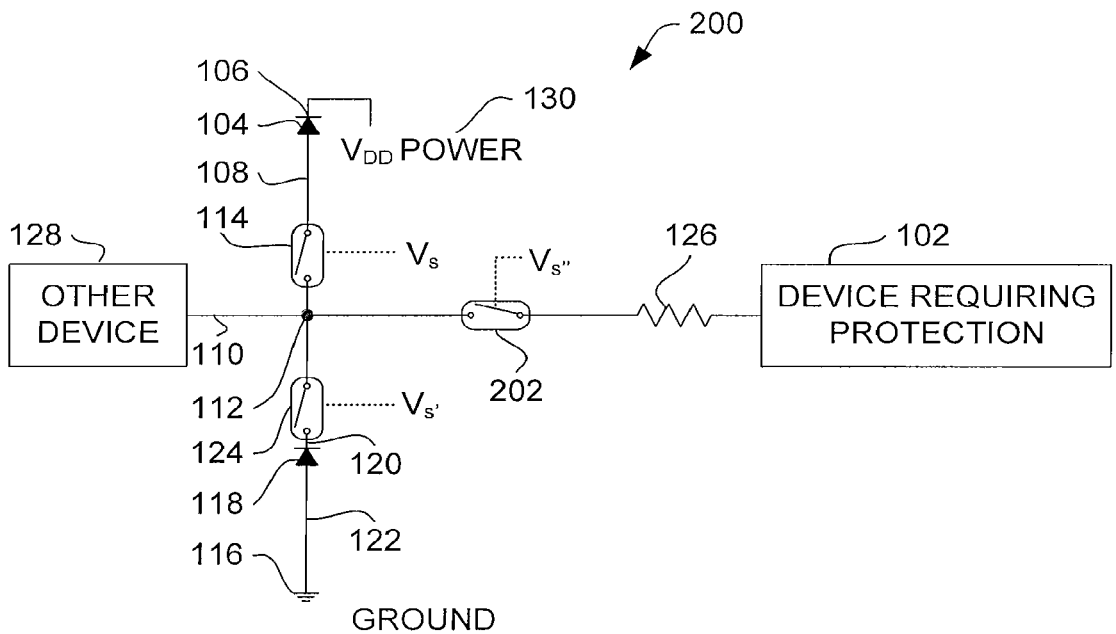
FIG. 2 is a diagram illustrating an electrostatic protection circuit including switched diodes and a switched resistor, according to some embodiments.

FIG. 2 is a diagram illustrating an electrostatic protection circuit including switched diodes and a switched resistor, according to some embodiments. The system 200 differs from the system in FIG. 1 in that it includes a third switch 202 coupling the resistor 126 and the integrated circuit and the node 112. In various embodiments, the third switch 202 is mechanical. In various embodiments, the third switch 202 is controlled by voltage $V_{s''}$, such as via an electromagnet to influence two or more contacts into and out of electrical communication. In some examples, $V_{s''}$ is provided in parallel with one or both of $V_s$ and voltage $V_{s'}$. In additional examples $V_{s''}$ is controlled independently of those voltages. The first switch 114 and second switch 124, in some instances, are one-way switches as described herein, while the third switch 202 is not a one-way switch. In additional examples, the third switch 202 is one-way and the first and second are not. Configurations in which the first, second and third switches are one-way are possible. Additionally, some embodiments include configurations in which the first, second and third switches switch between conducting and nonconducting repeatedly.

In various embodiments, the mechanical switch 202 is part of an integrated circuit located on the same integrated circuit as the first 114 and second 124 switches. In some examples, the third switch 202 and the device requiring protection 102 are on the same silicon circuit that is separate from the silicon circuit of the first 114 and the second 124 switches. In some examples, the third switch 202 is mechanical while the first 114 and the second 124 switches are solid state switches. In additional examples, the third switch 202 is solid state while the first 114 and the second 124 switches are mechanical. All mechanical switches are used in some embodiments. All solid-state switches are used in additional embodiments.

In various embodiments, in a first mode of operating, the first switch 114, the second switch 124 are held in a conducting position, while the third switch 202 is held in a nonconducting position. In some embodiments, the first and second switches are held in a conducting position concurrently. In some embodiments, in a second mode of operating, the first switch 114 and second switch 124 are held in a nonconducting position while the third switch 202 is held in a conducting position. In some embodiments, the first and second switches are held in a nonconducting position concurrently. One or more of the first, second and third switches are switched between conducting and nonconducting concurrently in various embodiments.

In various embodiments, a hardware supervising system controls the switching between conducting and nonconducting of the first switch 114, second switch 124 and third switch 202. Switching one or both of the first switch 114 and the second switch 124 to a nonconducting state can increase the signal rate possible between the other device 128 and the device requiring protection 102. This is due in part to a reduction in capacitance of the associated signal circuit caused, in some examples, by one or more diodes used for ESD protection.

Figure 3:
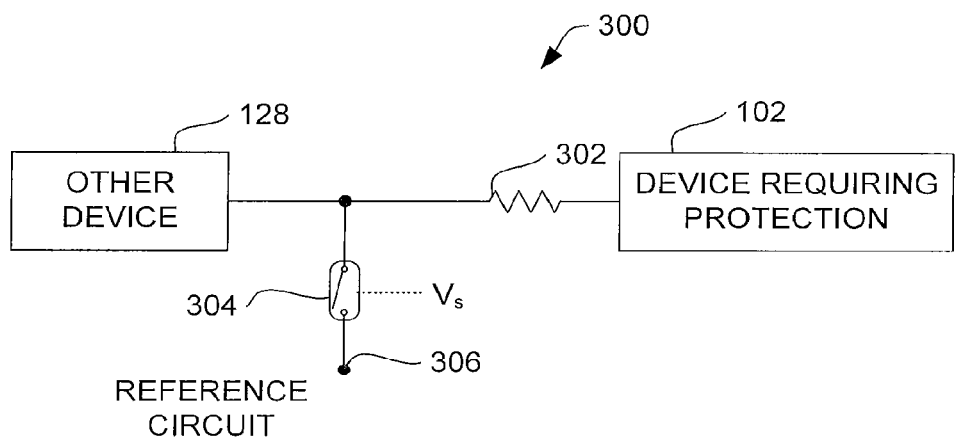
FIG. 3 is a diagram illustrating an electrostatic protection circuit including a switched reference circuit, according to some embodiments.

FIG. 3 is a diagram illustrating an electrostatic protection circuit including a switched ground, according to some embodiments. The electrostatic discharge system 300 of FIG. 3 includes a device requiring protection 102 and another device 128. The other device 128 can be a pad for soldering or for making contact in a socket or other connector in some embodiments. The other device 128 can be an integrated circuit separate from an integrated circuit including the device requiring protection 102 in additional embodiments. The device requiring protection 102 and the other device 128 can be part of the same integrated circuit, in some embodiments. In additional embodiments, the device requiring protection 102 and the other device 128 are distributed among multiple integrated circuits such that the device requiring protection 102 is on a first integrated circuit, and the other device 128 is part of a second integrated circuit.

The device illustrated includes a resistor 302. The device additionally includes a switch 304. The switch 304 is mechanical in some embodiments. In additional embodiments, the switch 304 is solid state. In some embodiments, a user activates the switch 304 manually. In additional embodiments, the switch 304 is responsive to a voltage $V_s$. Such a voltage electromagnetically closes a contact in some embodiments by pulling a first contact into contact with a second contact such that the first and second contacts are in electrical communication. Additionally, some embodiments use electromagnetic energy to push contacts out of electrical conduction. A coil is used to generate a magnetic field in some embodiments. The device operates to direct some or all of the voltage caused by an electrostatic discharge to reference circuit 306. The reference circuit is a ground, in some embodiments. Additional embodiments include a circuit having a voltage. Switching the switch 304 to a nonconducting state can increase the signal rate possible between the other device 128 and the device requiring protection 102. This is due in part to a reduction in capacitance of the associated signal circuit caused, in some examples, by additional diodes used for ESD protection.

Figure 4:
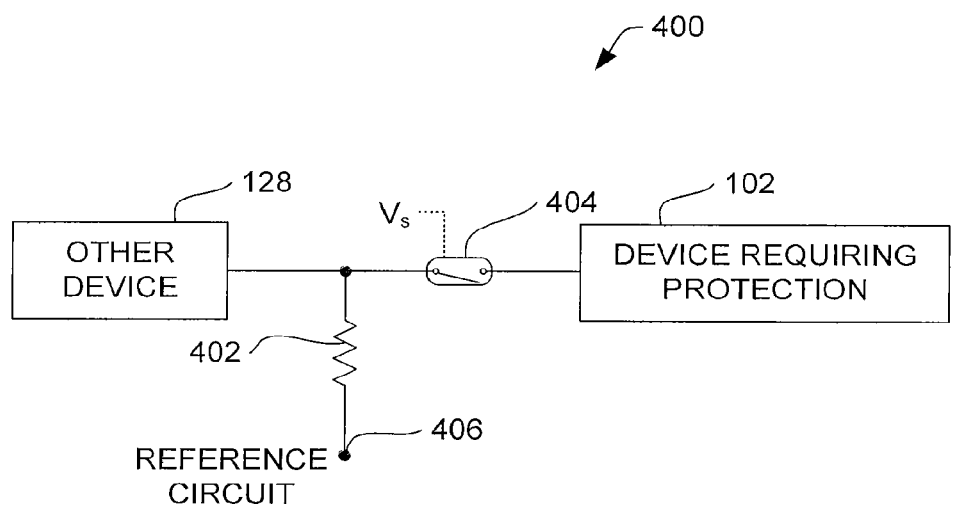
FIG. 4 is a diagram illustrating an electrostatic protection circuit including a switched signal, according to some embodiments.

FIG. 4 is a diagram illustrating an electrostatic protection circuit including a switched signal, according to some embodiments. The electrostatic discharge system 400 includes a device requiring protection 102 and another device 128, as referenced herein. The diagram additionally includes a resistor 402. The diagram also includes a switch 404. The switch 404 is mechanical in some embodiments. In additional embodiments, the switch 404 is solid state. In some embodiments, a user activates the switch 404 manually. In additional embodiments, the switch 404 is responsive to a voltage V. Such a voltage electromagnetically closes a contact in some embodiments by pulling a first contact into contact with a second contact such that the first and second contacts are in electrical communication. Additionally, some embodiments use electromagnetic energy to push contacts out of electrical conduction. A coil is used to generate a magnetic field in some embodiments. The device operates to direct some or all of the voltage caused by an electrostatic discharge to reference circuit 406. The reference circuit is a ground, in some embodiments. Additional embodiments include a circuit having a voltage. The use of the switch 404 can increase the signal rate possible between the other device 128 and the device requiring protection 102. This is due in part to a reduction in capacitance of the associated signal circuit caused, in some examples, by additional resistors used for ESD protection.

Figure 5:
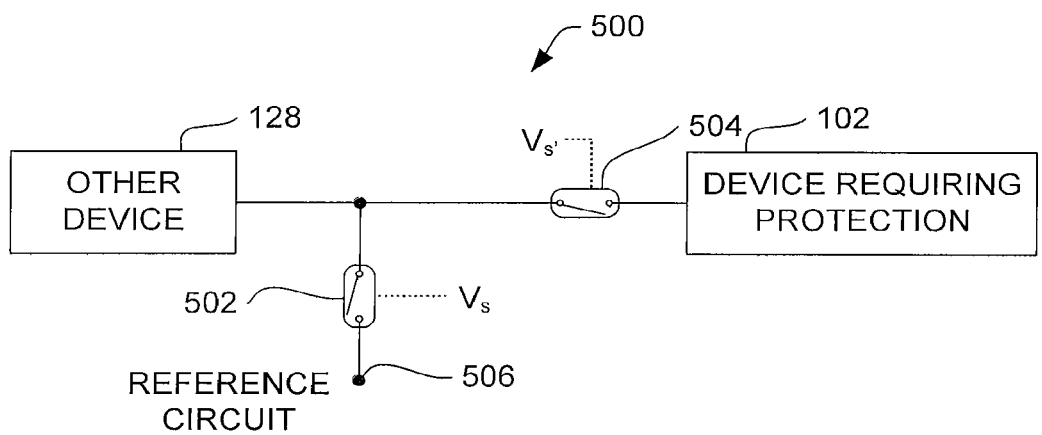
FIG. 5 is a diagram illustrating an electrostatic protection circuit including a switched signal and a switched reference circuit, according to some embodiments.

FIG. 5 is a diagram illustrating an electrostatic protection circuit including a switched signal and a switched ground, according to some embodiments. The electrostatic discharge system 500 includes a device requiring protection 102 and another device 128, as referenced herein. The diagram additionally includes a first switch 502 and a second switch 504. One or both of the switches are mechanical in various embodiments. In some of these embodiments, one or both of switches 502 and 504 are solid state. In some embodiments, both of the switches are solid state. In some embodiments, a user activates one or both of the switches 502 and 504 manually. In additional embodiments, switches 502 and 504 are responsive to a voltage $V_s$ and voltage $V_{s'}$ respectively. Such voltages control the switches as described herein.

The device operates to direct some or all of the voltage caused by an electrostatic discharge to reference circuit 506. The reference circuit is a ground, in some embodiments. Additional embodiments include a circuit having a voltage. For example, during an assembly or other process involving the device requiring protection 102 and the other device 128, first switch 502 can remain conducting concurrent with the second switch 504 remaining nonconducting. Accordingly, an electrostatic discharge voltage is directed to reference circuit 506. In some embodiments, after assembly when the threat of electrostatic discharge is reduced, the first switch 502 is nonconducting, and the second switch 504 is conducting, putting the device requiring protection 102 into electrical communication with the other device 128. Switching switch 502 to a nonconducting state can increase the signal rate possible between the other device 128 and the device requiring protection 102. This is due in part to a reduction in capacitance of the associated signal circuit caused, in some examples, by one or more resistors used for ESD protection.

Figure 6:
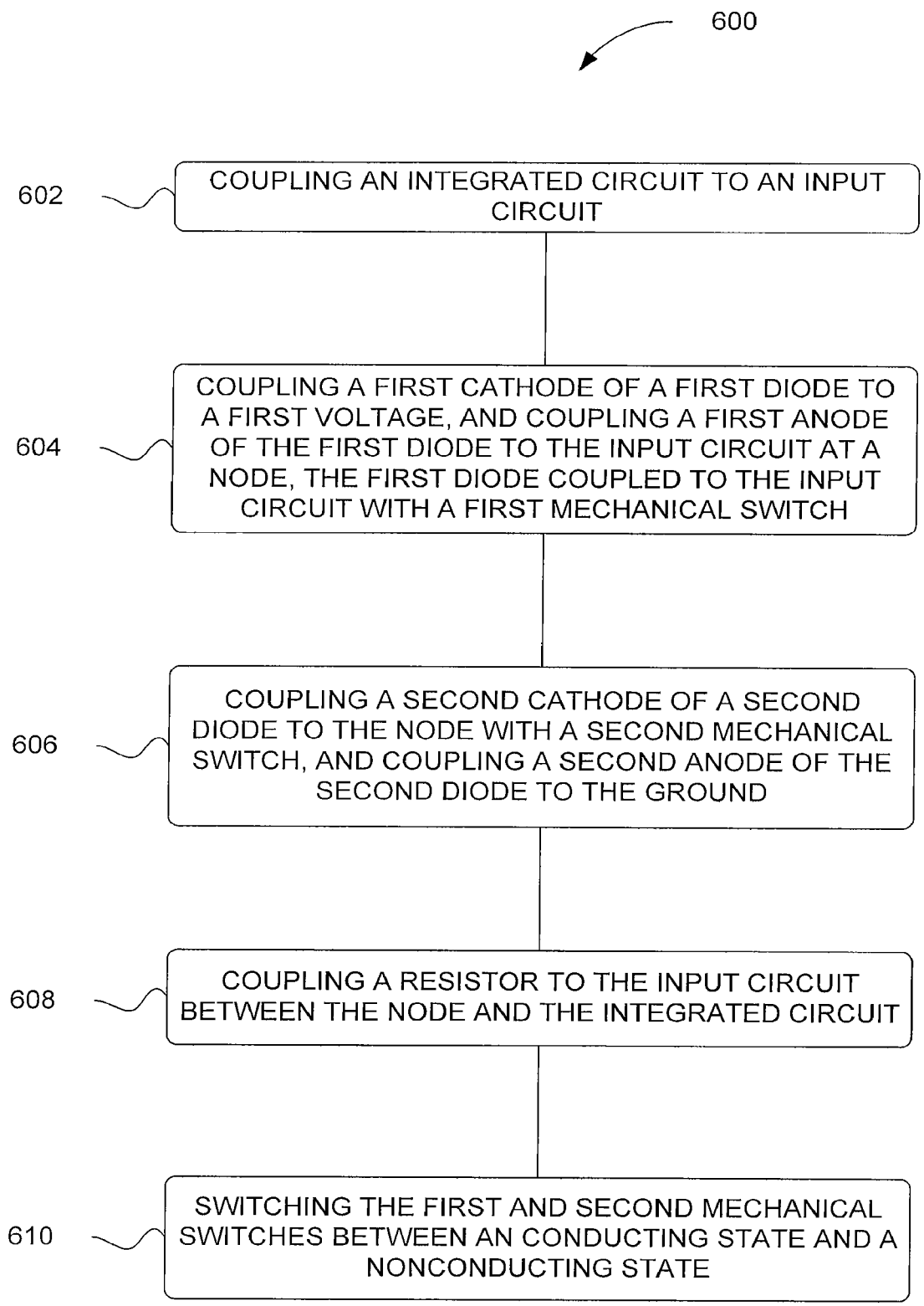
FIG. 6 is a flow chart including a method of protecting a circuit, according to some embodiments.

FIG. 6 is a flow chart including a method of protecting a circuit, according to some embodiments. In various embodiments, at 602, the method includes coupling an integrated circuit to an input circuit. At 604, the method includes coupling a first cathode of a first diode to a first voltage, and coupling a first anode of the first diode to the input circuit at a node, the first diode coupled to the input circuit with a first mechanical switch. In some embodiments, the first voltage is $V_{DD}$ power, but the present subject matter is not so limited. The method further includes, at 606, coupling a second cathode of a second diode to the node with a second mechanical switch, and coupling a second anode of the second diode to a ground. The first switch is mechanical in some embodiments, and is solid state in additional embodiments. Further, at 608, coupling a resistor to the input circuit between the node and the integrated circuit. The second switch is mechanical in some embodiments, and is solid state in additional embodiments.

At 610, the method includes switching the first and second mechanical switches between a conducting state and a nonconducting state. Such switching could be via manual operation, or via operation of software enabled to control the first and second mechanical switches. Such switching could occur as part of a "power on reset" in some examples. Additionally, as described herein, a hardware supervisory system could control one or both of the switches.

Figure 7:
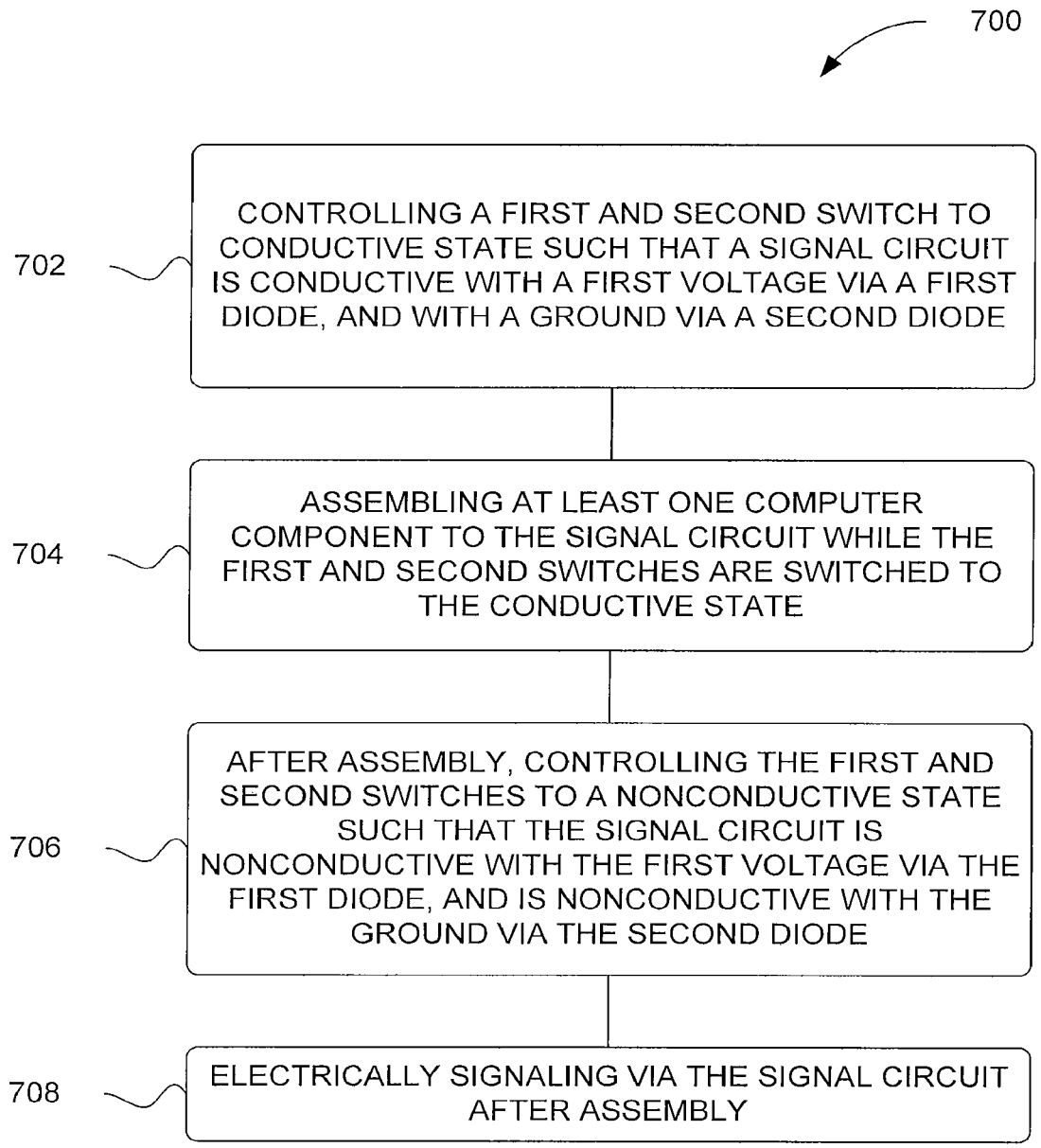
FIG. 7 is a flow chart including a method of protecting a circuit, according to some embodiments.

FIG. 7 is a flow chart including a method of protecting a circuit, according to some embodiments. At 702, the embodiment includes controlling a first and second switch to switch the first and second switches to a conductive state such that a signal circuit is conductive with a first voltage via a first diode, and with a ground via a second diode. At 704, the embodiment includes assembling at least one computer component to the signal circuit while the first and second mechanical switches are switched to a conductive state. In some examples, the circuit is in a protecting state during this configuration. At 706, after assembly, the embodiment includes controlling the first and second switches to switch to a nonconductive state such that the signal circuit is nonconductive with the first voltage via the first diode, and is nonconductive with the ground via the second diode. At 708, the embodiment includes electrically signaling via the signal circuit after assembly. In some examples, the circuit is in an operating state during this configuration.

Optional method embodiments include additional features. For example, in some embodiments, the method includes switching the first and second mechanical switches to conducting during the coupling of the node to an additional circuit, and switching the first and second mechanical switches to nonconducting after the coupling of the node to an additional circuit. In some embodiments, the additional circuit is part of a circuit board assembly.

In some embodiments, the method includes switching the switches to a nonconducting state after a power-on reset. Methods are contemplated in which the integrated circuit is part of a system including a subsystem, and further comprising verifying the subsystem before switching the first and second mechanical switches to the nonconducting state. Some of these methods include, but are not limited to, switching the first and second mechanical switches to a conducting state during shipment, assembly and installation of the subsystem to the system. The conducting state is useful for at least these phases of computer construction, and other phases are additionally contemplated.

Method embodiments are contemplated in which the first mechanical switch is biased, and further comprising coupling an electromagnet to the first mechanical switch and switching the first mechanical switch between the conducting state and the nonconducting state by controlling power to the electromagnet. In some of these methods, the first mechanical switch is biased to the conducting state. Various methods include coupling a fuse to the first electromagnet and controlling the fuse to blow such that the first switch is nonconducting after assembly has been completed.

The present subject matter provides systems adapted to pre-determine when a switch used to protect an integrated circuit should be nonconducting or conducting. In such designs, electrostatic discharge voltage is not used to switch the switch between conducting and nonconducting, as the switch is already in a nonconducting or conducting state depending on a control, such as a manual control, a system-based control (e.g., a hardware supervising control), or an automatic control (e.g., a system that senses that a device requiring protection has been successfully installed in a larger electronics system and is therefore substantially clear of the threat of damage from electrostatic discharge).

For example, in some embodiments, a process is controlled such that protection is active before a device requiring protection is powered, and protection is disabled once the integrated circuit is powered on or a system deactivates protection. As such, in various embodiments, the circuit of FIG. 1 provides diode protection before the device requiring protection 102 is powered on, and after the device is powered and begins to successfully operate, the switches of FIG. 1 are switched to not conduct, and the device operates without the electrostatic discharge protection of the first 104 and second 118 diodes. Such a configuration can provide for higher signal capacity, as capacitance for the system 100 is reduced.

Various process steps are contemplated that would benefit from such a design. In a wafer processing method, if a switch were implemented as part of a way, e.g. as a MEMS device, protection could commence once a top layer of the wafer was completed. During packaging, protection could remain enabled. During assembly of the device requiring protection to another device, protection could remain enabled. During system-off (e.g., during shipping or assembly of a new system), protection could remain enabled. During system power-on, protection could remain on during commencement of power-on, and then be deactivated, such as by a hardware supervising system or another control system. Even during system-on, should the system not require high-speed, low capacitance signal capacity during some portion of its power-on operation could benefit from protection. However, various embodiments disable protection during normal use once a single power-on operation is recorded as being successful.

The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations, or variations, or combinations of various embodiments. Combinations of the above embodiments, and other embodiments not specifically described herein, will be apparent to those of skill in the art upon reviewing the above description.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own.

What is claimed is:
1. An apparatus, comprising:
an integrated circuit, comprising an input circuit;
a first diode including a first anode and a first cathode, with the first cathode coupled to a first voltage, the first anode coupled to the input circuit at a node via a first mechanical switch;

a second diode including a second anode and a second cathode, with the second cathode coupled to the node via a second mechanical switch, the second anode coupled to a ground;

a resistor coupled to the input circuit between the integrated circuit and the node, wherein in a first mode of operating, the first mechanical switch and the second mechanical switch are concurrently and reversibly switched to conducting, and in a second mode of operating, the first and second mechanical switches are concurrently and reversibly switched to nonconducting, wherein the first mechanical switch further includes an electromagnet configured to selectively switch the first mechanical switch between conducting and nonconducting;

a fuse coupled to the electromagnet; and a fuse blow circuit coupled to the fuse and adapted to provide a voltage to the fuse to blow the fuse upon receipt of a fuse blow signal.

2. The apparatus of claim 1, further comprising a supervising program configured to selectively control the first and second switches.

3. The apparatus of claim 1, further comprising wherein the first mechanical switch is mechanically biased to conducting.

4. The apparatus of claim 1 wherein the second mechanical switch further includes an electromagnet configured to selectively switch the second mechanical switch between conducting and nonconducting.

5. The apparatus of claim 1, wherein the integrated circuit is part of a first integrated circuit, and the first and second diodes and the first and second switches are part of a second integrated circuit.

6. An apparatus, comprising:

an integrated circuit, comprising an input circuit;

a first microelectromechanical switch that is reversibly switchable between conducting and nonconducting, the first microelectromechanical switch coupled to the input circuit between the integrated circuit and a node;

an electromagnet adapted to switch the first microelectromechanical switch between conducting and nonconducting;

a fuse coupled to the electromagnet;

a fuse blow circuit coupled to the fuse and adapted to provide a voltage to the fuse to blow the fuse upon reception of a fuse blow signal; and a resistor coupled between the node and a reference circuit.

7. The apparatus of claim 6, further comprising a circuit board assembly including an additional circuit, with the node coupled to the additional circuit.

* * * * *